(12) United States Patent
Zhuo

(10) Patent No.: US 11,159,639 B2
(45) Date of Patent: Oct. 26, 2021

(54) SYSTEMS AND METHODS FOR DETERMINING COMBINATIVE SERVICE REQUESTERS

(71) Applicant: BEIJING DIDI INFINITY TECHNOLOGY AND DEVELOPMENT CO., LTD., Beijing (CN)

(72) Inventor: Chengxiang Zhuo, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 413 days.

(21) Appl. No.: 16/232,045

(22) Filed: Dec. 25, 2018

(65) Prior Publication Data

US 2019/0132418 A1 May 2, 2019

Related U.S. Application Data

(63) Continuation of application No. PCT/CN2018/091005, filed on Jun. 13, 2018.

(30) Foreign Application Priority Data

Jun. 14, 2017 (CN) .......................... 201710447903.8

(51) Int. Cl.
*H04L 29/08* (2006.01)
*G06Q 50/30* (2012.01)
*G06Q 10/02* (2012.01)

(52) U.S. Cl.
CPC ............ *H04L 67/32* (2013.01); *G06Q 10/02* (2013.01); *G06Q 10/025* (2013.01); *G06Q 50/30* (2013.01)

(58) Field of Classification Search
CPC ........ H04L 67/32; G06Q 50/30; G06Q 10/02; G06Q 10/025
See application file for complete search history.

(56) References Cited

U.S. PATENT DOCUMENTS 10,248,913 B1 * 4/2019 Gururajan ............. G06Q 10/02
10,467,561 B2 * 11/2019 Haparnas ........... G06Q 10/1093
(Continued)

FOREIGN PATENT DOCUMENTS

| CN | 104158568 A | 11/2014 |
|---|---|---|
| CN | 104268664 A | 1/2015 |

(Continued)

OTHER PUBLICATIONS

Extended European Search Report in European Application No. 18814477.8 dated Jul. 3, 2019, 7 Pages.
(Continued)

*Primary Examiner* — Nam T Tran
(74) *Attorney, Agent, or Firm* — Metis IP LLC

(57) ABSTRACT

A method may include receiving a first service request from a first service requester. The method may include obtaining a plurality of first candidate service requesters. The method may include determining whether there is at least one second service requester associated with a second service request that is combinative with the first service request in the plurality of first candidate service requesters. The method may include determining a plurality of third service requesters different from the plurality of first candidate service requesters in response to a determination that there is no the at least one second service requester. The method may include determining at least one target service requester from the plurality of third service requesters. The method may include transmitting a carpooling message to the at least
(Continued)

one target service requester to initiate a third service request that is combinative with the first service request.

20 Claims, 6 Drawing Sheets

(56) References Cited

U.S. PATENT DOCUMENTS

| | | | |
|---|---|---|---|
| 2003/0177020 A1 | 9/2003 | Okamura | |
| 2007/0276595 A1* | 11/2007 | Lewinson | G06Q 10/02 |
| | | | 701/533 |
| 2009/0234658 A1 | 9/2009 | Greenwell et al. | |
| 2010/0280884 A1* | 11/2010 | Levine | G01C 21/3438 |
| | | | 705/13 |
| 2012/0290652 A1* | 11/2012 | Boskovic | G06Q 50/30 |
| | | | 709/204 |
| 2013/0054281 A1* | 2/2013 | Thakkar | G06Q 50/30 |
| | | | 705/5 |
| 2016/0138928 A1* | 5/2016 | Guo | G06Q 10/02 |
| | | | 701/537 |
| 2016/0292596 A1* | 10/2016 | Gaitan | G06Q 10/025 |
| 2016/0364679 A1 | 12/2016 | Cao | |
| 2019/0311454 A1* | 10/2019 | Mitsumaki | G06Q 50/30 |

FOREIGN PATENT DOCUMENTS

| | | |
|---|---|---|
| CN | 104751625 A | 7/2015 |
| CN | 104900049 A | 9/2015 |
| CN | 105227604 A | 1/2016 |
| CN | 105279957 A | 1/2016 |
| CN | 105792134 A | 7/2016 |
| CN | 106027637 A | 10/2016 |
| CN | 106339763 A | 1/2017 |
| CN | 106548240 A | 3/2017 |
| JP | 2015035044 A | 2/2015 |
| KR | 20150133953 A | 12/2015 |
| WO | 2011069170 A1 | 6/2011 |
| WO | 2017143815 A1 | 8/2017 |
| WO | 2017166877 A1 | 10/2017 |

OTHER PUBLICATIONS

Vincent Chang, GrabTaxi's Edge Lies in Real-Time Data Analytics, Tech News & Top Stories—The Straits Times, 2015, 3 pages.
Timothybrownsf, Matchmaking in Lyft Line—Part 2, Lyft Engineering, 2016, 7 pages.
Hoang Thanh Lam et al., (Blue) Taxi Destination and Trip Time Prediction from Partial Trajectories, ECML/PKDD Discovery Challenge, 2015, 12 pages.
The Third Examination Report in Australian Application No. 2018282296 dated Sep. 23, 2020, 7 pages.
International Search Report in PCT/CN2018/091005 dated Aug. 24, 2018, 4 pages.
Written Opinion in PCT/CN2018/091005 dated Aug. 24, 2018, 5 pages.
First Office Action in Chinese Application No. 201710447903.8 dated March 27, 2020, 18 pages.
Notice of Rejection in Japanese Application No. 2018-566535 dated Jun. 9, 2020, 6 pages.
Notification to Grant Patent Right for Invention in Chinese Application No. 201710447903.8 dated Feb. 23, 2021, 5 pages.

* cited by examiner

500

| Determining, when receiving a first service request from a first service requester, whether there is at least one second service requester that is combinative with the first service requester in a plurality of first candidate service requesters, wherein each of the plurality of first candidate service requesters is associated with a pending request | 502 |

↓

| Obtaining travel information of the first service request in response to a determination that there is no the at least one second service requester, and determining, based on the travel information, a plurality of third service requesters that are different from the plurality of first candidate service requesters and meet a predetermined condition | 504 |

↓

| Determining at least one target service requester from the plurality of third service requesters, and transmitting a carpooling message to the at least one target service requester, wherein the carpooling message excites the at least one target service requester to carpool with the first service requester | 506 |

FIG. 5

SYSTEMS AND METHODS FOR DETERMINING COMBINATIVE SERVICE REQUESTERS

CROSS-REFERENCE TO RELATED APPLICATIONS

This application is a continuation of International Application No. PCT/CN2018/091005, filed on Jun. 13, 2018, which claims priority of Chinese Patent Application No. 201710447903.8 filed on Jun. 14, 2017, the entire contents of which are hereby incorporated by reference.

TECHNICAL FIELD

The present disclosure generally relates to an online to offline service, and in particular, to systems and methods for determining combinative service requesters.

BACKGROUND

With the development of Internet, online to offline services (e.g., online taxi-hailing services) become more and more popular. The online to offline services successfully solve the problem of information asymmetry between a service provider (e.g., a driver) and a service requester (e.g., a passenger). Taking the online taxi-hailing services, for example, some passengers choose a carpooling service to share a ride with others. The existing carpooling process is passive. When a passenger initiates a first service request, an online to offline service platform may search for a second service request to be combined with the first service request from a plurality of service requests for carpooling based on, for example, the destinations and/or the departure locations. If there is no service request that is combinative with the first service request in the plurality of service requests to be carpooled, the online to offline service platform may assign an idle driver (e.g., a driver that is currently carrying no passenger) to the first service request. A major problem of the existing passive carpooling process is that the online to offline service platform has a short time to find a combinative service request. For example, a new service request having a similar departure location and a similar destination to that of the first service request one minute after the first service request was initiated may be missed. Since the online to offline service platform did not receive the new service request one minute ago, the first service request had already been assigned to an idle driver and probably has departed from the departure location. Consequently, the online to offline service platform may also have to assign another idle driver to the new service request because the online to offline service platform can not find a combinative service request for the new service request. As such, the carpooling transaction rate may be relatively lower. Therefore, it is desirable to provide systems and methods for determining combinative service requesters to improve the carpooling transaction rate.

SUMMARY

According to a first aspect of the present disclosure, a system for determining combinative service requesters may include one or more storage media and one or more processors configured to communicate with the one or more storage media. The one or more storage media may include a set of instructions. When the one or more processors executing the set of instructions, the one or more processors may be directed to perform one or more of the following operations. The one or more processors may receive a first service request from a first service requester (operation (1)). The first service request may include a departure time, a departure location, and a destination. The one or more processors may obtain a plurality of first candidate service requesters, each of which is associated with a pending request (operation (2)). The one or more processors may determine whether there is at least one second service requester associated with a second service request that is combinative with the first service request in the plurality of first candidate service requesters (operation (3)). The one or more processors may determine a plurality of third service requesters different from the plurality of first candidate service requesters in response to a determination that there is no the at least one second service requester (operation (4)). The one or more processors may determine at least one target service requester from the plurality of third service requesters (operation (5)). The one or more processors may transmit a carpooling message to the at least one target service requester to initiate a third service request that is combinative with the first service request (operation (6)).

In some embodiments, to determine the plurality of third service requesters, the one or more processors may obtain a plurality of second candidate service requesters different from the plurality of first candidate service requesters. The one or more processors may select, among the plurality of second candidate service requesters, the plurality of third service requesters. Each of the plurality of third service requesters, has initiated a first predetermined number of historical requests for a historical departure location being within a region including the departure location, and/or for a historical departure time being within a predetermined time interval including the departure time. The first predetermined number may be greater than a first number threshold. Each of the plurality of third service requesters may allow to be transmitted the carpooling message and/or have historical receipt of a second predetermined number of the carpooling messages in a first predetermined time period. The second predetermined number may be less than a second number threshold.

In some embodiments, to determine the region including the departure location, the one or more processors may perform a Geohash algorithm to determine the region including the departure location. Alternatively or additionally, the one or more processors may determine a circle region that is centered at the departure location and with a radius of a predetermined value. Alternatively or additionally, the one or more processors may determine a rectangle region including the departure location.

In some embodiments, to determine the at least one target service requester, the one or more processors may determine a probability of a carpooling between the plurality of third service requesters with the first service requester (operation (7)). The one or more processors may rank the probability of the carpooling (operation (8)). The one or more processors may design a number of the plurality of third service requesters, successively starting with the highest probability based on the ranking or having the probability being greater than a probability threshold, as the at least one target service requester (operation (9)).

In some embodiments, the one or more processors may determine whether the third service request is initiated after the carpooling message is transmitted to the at least one target service requester. The one or more processors may remove the at least one target service requester from the plurality of third service requesters and repeat operation (7) if the third service request is not initiated.

In some embodiments, to repeat operation (7) may result in a new number of the plurality of third service requesters as the at least one target service requester, wherein the new number may be larger than an immediate-last number of the at least one target service requester.

In some embodiments, the one or more processors may transmit, to the first service requester, a notice asking whether the first service requester is willing to wait for a second predetermined time period to allow the one or more processors find a request that is combinative with the first service request. The one or more processors may determine that the first service requester is willing to wait for the second predetermined time period based on a response to the notice from the first service requester, then execute operations (4)-(6), or otherwise, assign a service provider to the first service requester and place the first service requester into the first candidate service requesters.

In some embodiments, the one or more processors may send personal information of the first service requester to the at least one target service requester.

In some embodiments, the one or more processors may transmit one or more coupons to the first service requester or the at least one target service requester.

According to another aspect of the present disclosure, a method for determining combinative service requesters may include one or more of the following operations. One or more processors may receive a first service request from a first service requester. The first service request may include a departure time, a departure location, and a destination. The one or more processors may obtain a plurality of first candidate service requesters, each of which is associated with a pending request. The one or more processors may determine whether there is at least one second service requester associated with a second service request that is combinative with the first service request in the plurality of first candidate service requesters. The one or more processors may determine a plurality of third service requesters different from the plurality of first candidate service requesters in response to a determination that there is no the at least one second service requester. The one or more processors may determine at least one target service requester from the plurality of third service requesters. The one or more processors may transmit a carpooling message to the at least one target service requester to initiate a third service request that is combinative with the first service request.

According to yet another aspect of the present disclosure, a system for determining combinative service requesters may include a determination module configured to receive a first service request from a first service requester, obtain a plurality of first candidate service requesters, each of which is associated with a pending request, and determine whether there is at least one second service requester associated with a second service request that is combinative with the first service request in the plurality of first candidate service requesters. The first service request may include a departure time, a departure location, and a destination. The system may also include a searching module configured to determine a plurality of third service requesters different from the plurality of first candidate service requesters in response to a determination that there is no the at least one second service requester. The system may also include a processing module configured to determine at least one target service requester from the plurality of third service requesters, and transmit a carpooling message to the at least one target service requester to initiate a third service request that is combinative with the first service request.

According to yet another aspect of the present disclosure, a non-transitory computer readable medium may comprise at least one set of instructions for determining combinative service requesters. The at least one set of instructions may be executed by one or more processors of a computer server. The one or more processors may receive a first service request from a first service requester. The first service request may include a departure time, a departure location, and a destination. The one or more processors may obtain a plurality of first candidate service requesters, each of which is associated with a pending request. The one or more processors may determine whether there is at least one second service requester associated with a second service request that is combinative with the first service request in the plurality of first candidate service requesters. The one or more processors may determine a plurality of third service requesters different from the plurality of first candidate service requesters in response to a determination that there is no the at least one second service requester. The one or more processors may determine at least one target service requester from the plurality of third service requesters. The one or more processors may transmit a carpooling message to the at least one target service requester to initiate a third service request that is combinative with the first service request.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for determining combinative service requesters according to some embodiments of the present disclosure.

DETAILED DESCRIPTION

Figure 1:
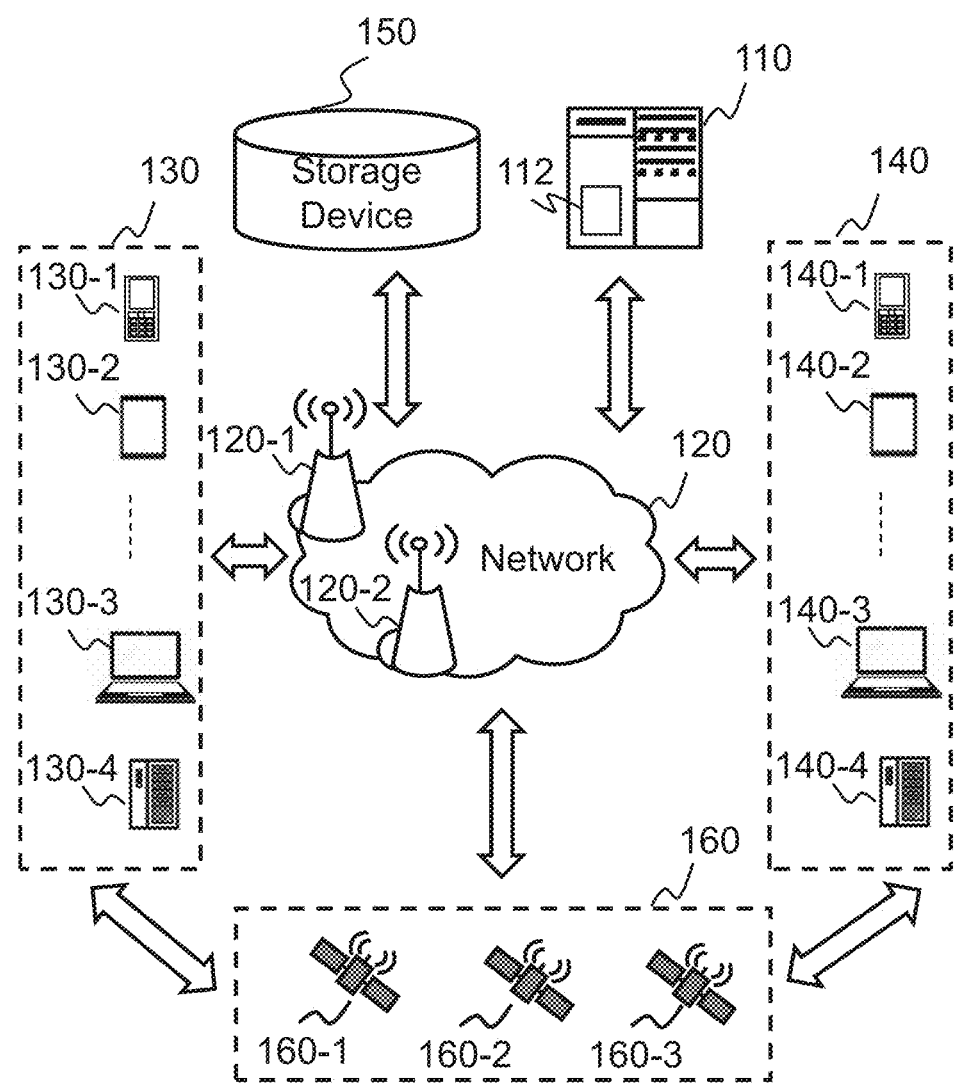
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure.

It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding a carpooling service, it should also be understood that this is only an exemplary embodiment. The system or method of the present disclosure may be applied to any other kind of online to offline service. For example, the system or method of the present disclosure may be applied to different transportation systems including land, ocean, aerospace, or the like, or any combination thereof. Those transportation systems may provide transportation services transporting a subject from one location to another location using a vehicle.

The subject may include passengers and/or goods. The vehicle of the transportation service may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The transportation services may include a taxi hailing service, a chauffeur service, a delivery service, a carpooling service, a bus service, a take-out service, a driver hiring service, a shuttle service, or the like, or any combination thereof. The application scenarios of the system or method of the present disclosure may include a web page, a plug-in of a browser, a client terminal, a custom system, an internal analysis system, an artificial intelligence robot, or the like, or any combination thereof.

The carpooling service may refer to an arrangement that combines two or more transportation services into a new transportation service. For example, two taxi services may be combined into a new transportation service. As another example, two delivery services may be combined into a new transportation services. As still another example, a taxi service and a delivery service may be combined into a new transportation service.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "request," "service request," "order," "carpooling order," "carpooling request," "vanpooling order" and "vanpooling request" in the present disclosure refers to a request that initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for determining combinative service requesters. When a service requester (e.g., a passenger) initiates a first service request associated with a carpooling service to share a ride with others, an online to offline service platform may search for a second service request to be combined with the first service request from a plurality of service requests to be carpooled. If there is no service request that is combinative with the first service request in the plurality of service requests to be carpooled, the online to offline service platform may search for a target service requester that is currently initiating no service request but has a potential to initiate a service request combinative with the first service request, and transmit a carpooling message to the target service requester to trigger the target service requester to initiate such a service request.

It should be noted that online to offline service, such as online carpooling service, is a new form of service rooted only in post-Internet era. It provides technical solutions to service requesters and service providers that could raise only in post-Internet era. In pre-Internet era, when a passenger hails a taxi on street, the service request and acceptance occur only between the passenger and one taxi driver that sees the passenger. If the passenger hails a taxi through telephone call, the service request and acceptance may occur only between the passenger and one service provider (e.g., one taxi company or agent). If a driver wants to provide a carpooling service, the driver has to ask a passenger face to face and determine whether the carpooling service is possible to be provided to the passenger by experience of the driver. Online carpooling service, however, obtains service requests through Internet and finds combinative service requests in real-time and automatically. The carpooling service also allows a service request initiated by a service requester (e.g., a passenger) to be distributed in real-time and automatically to a vast number of individual service providers (e.g., taxi drivers) distance away from the service requester and allows a plurality of service provides to respond to the service request simultaneously and in real-time. Therefore, through Internet, the online to offline service systems may provide a much more efficient transaction platform for the service requesters and the service providers that may never met in a traditional pre-Internet transportation service system.

FIG. 1 is a schematic diagram illustrating an exemplary online to offline service system according to some embodiments of the present disclosure. The online to offline service system 100 may include a server 110, a network 120, a requester terminal 130, a provider terminal 140, a storage device 150, and a positioning system 160. The server 110 may include a carpooling request processing device 112.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage device 150 via the network 120. As another example, the server 110 may be directly connected to the requester terminal 130, the provider terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a carpooling request processing device 112. The carpooling request processing device 112 may process information and/or data relating to the online to offline service. For example, the carpooling request processing device 112 may determine combinative service requesters. In some embodiments, the carpooling request processing device 112 may include one or more processing engines (e.g., single-core processing engine(s) or multi-core processor(s)). Merely by way of example, the carpooling request processing device 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the online to offline service system 100 (e.g., the server 110, the requester terminal 130, the provider terminal 140, the storage device 150, or the positioning system 160) may send information and/or data to other component(s) in the online to offline service system 100 via the network 120. For example, the server 110 may obtain/acquire a service request from the requester terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "service requester," "requester," and "requester terminal" may be used interchangeably, and "service provider," "provider," and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of a user of the requester terminal 130 (e.g., a service requester) and/or the requester terminal 130.

In some embodiments, the provider terminal 140 may be a device that is similar to, or the same as the requester terminal 130. In some embodiments, the provider terminal 140 may be a device utilizing positioning technology for locating the position of a user of the provider terminal 140 (e.g., a service provider) and/or the provider terminal 140. In some embodiments, the requester terminal 130 and/or the provider terminal 140 may communicate with one or more other positioning devices to determine the position of the requester, the requester terminal 130, the provider, and/or the provider terminal 140. In some embodiments, the requester terminal 130 and/or the provider terminal 140 may send positioning information to the server 110.

The storage device 150 may store data and/or instructions. In some embodiments, the storage device 150 may store data obtained from the requester terminal 130 and/or the provider terminal 140. For example, the storage device 150 may store service requests obtained from the requester terminal 130. In some embodiments, the storage device 150 may store data and/or instructions that the server 110 may execute or use to perform exemplary methods described in the present disclosure. For example, the storage device 150 may store data and/or instructions that the server 110 may execute or use to determine combinative service requesters described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the online to offline service system 100 (e.g., the server 110, the requester terminal 130, the provider terminal 140, etc.). One or more components in the online to offline service system 100 may access the data or instructions stored in the storage device 150 via the network 120. In some embodiments, the storage device 150 may be directly connected to or communicate with one or more components in the online to offline service system 100 (e.g., the server 110, the requester terminal 130, the provider terminal 140, etc.). In some embodiments, one or more components in the online to offline service system 100 (e.g., the server 110, the requester terminal 130, the provider terminal 140, etc.) may have permission to access the storage device 150. In some embodiments, the storage device 150 may be part of the server 110.

The positioning system 160 may determine information associated with an object, for example, the requester terminal 130, the provider terminal 140, etc. For example, the positioning system 160 may determine a current location of the requester terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, the requester terminal 130, or the provider terminal 140 via wireless connections.

In some embodiments, information exchanging of one or more components in the online to offline service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
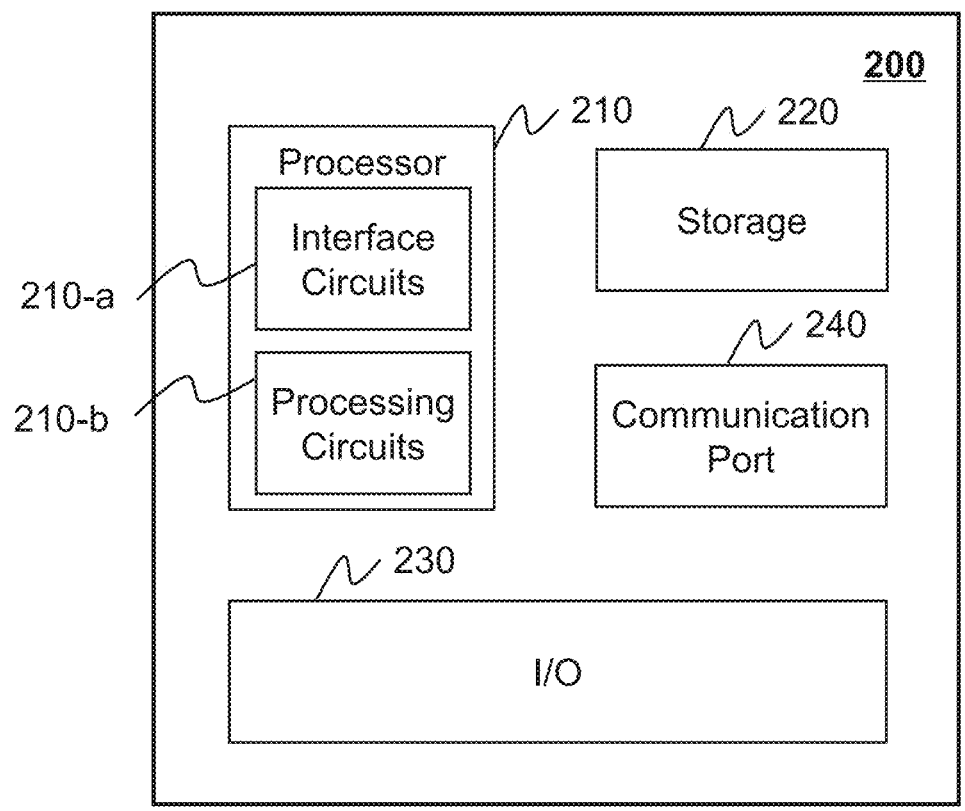
FIG. 2 is a schematic diagram illustrating exemplary hardware and/or software components of a computing device according to some embodiments of the present disclosure.

FIG. 2 is a schematic diagram illustrating exemplary hardware and/or software components of a computing device on which the carpooling request processing device 112 may be implemented according to some embodiments of the present disclosure. As illustrated in FIG. 2, the processing device 112 may be computing device 200, which may include a processor 210, a storage 220, an input/output (I/O) 230, and a communication port 240.

The processor 210 (e.g., logic circuits) may execute computer instructions (e.g., program code) and perform functions of the carpooling request processing device 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may determine combinative service requesters. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the requester terminal 130, the provider terminal 140, the storage device 150, and/or any other component of the online to offline service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the carpooling request processing device 112 for determining combinative service requesters.

The I/O 230 may input and/or output signals, data, information, etc. In some embodiments, the I/O 230 may enable a user interaction with the carpooling request processing device 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the carpooling request processing device 112 and the requester terminal 130, the provider terminal 140, the positioning system 160, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
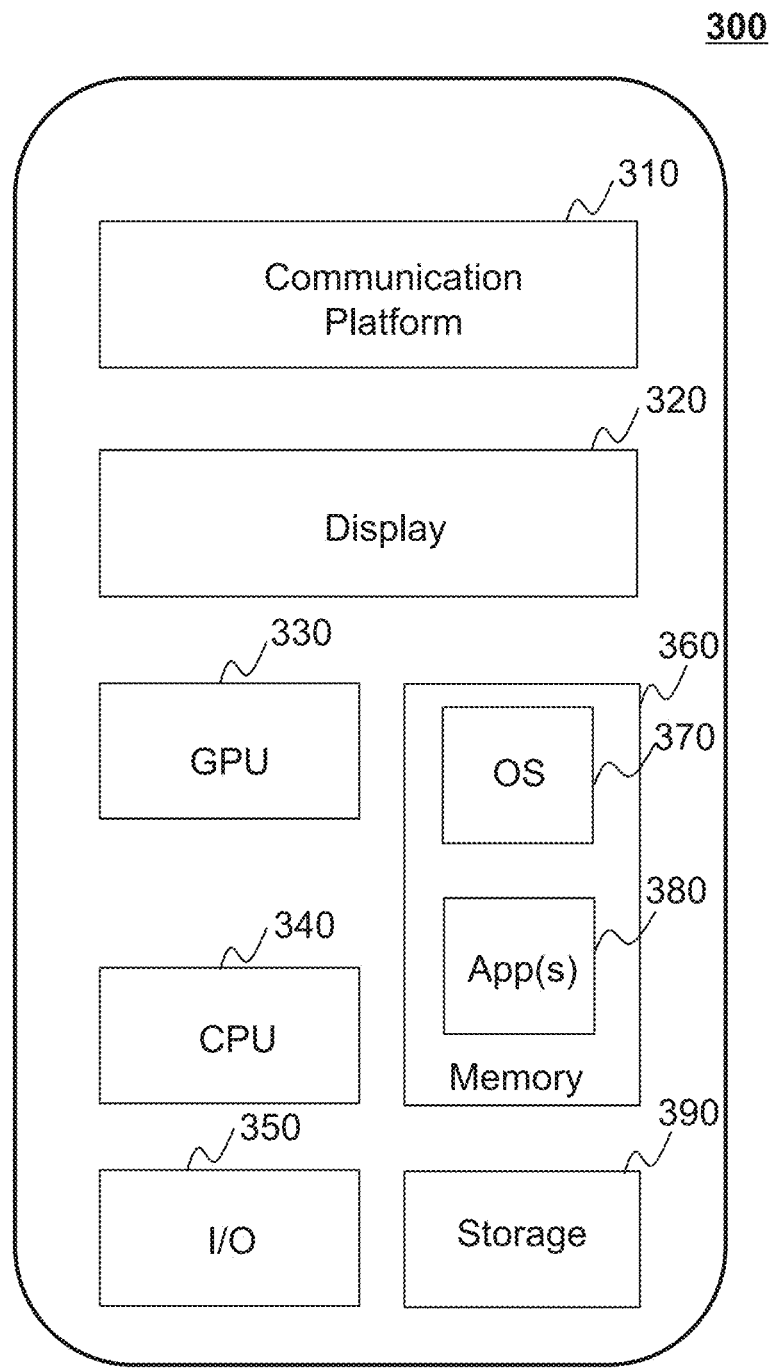
FIG. 3 a schematic diagram illustrating exemplary hardware and/or software components of a mobile device according to some embodiments of the present disclosure.

FIG. 3 a schematic diagram illustrating exemplary hardware and/or software components of a mobile device on which the requester terminal 130 and/or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to an online to offline carpooling service or other information from the carpooling request processing device 112, and sending information relating to an online to offline carpooling service or other information to the carpooling request processing device 112. User interactions with the information stream may be achieved via the I/O 350 and provided to the carpooling request processing device 112 and/or other components of the online to offline service system 100 via the network 120.

One of ordinary skill in the art would understand that when an element of the online to offline service system 100 performs, the element may perform through electrical signals and/or electromagnetic signals. For example, when the carpooling request processing device 112 processes a task, such as making a determination, or transmitting information, the carpooling request processing device 112 may operate logic circuits in its processor to process such task. When the carpooling request processing device 112 sends out data (e.g., a carpooling message) to the requester terminal 130, a processor of the carpooling request processing device 112 may generate electrical signals encoding the data. The processor of the carpooling request processing device 112 may then send the electrical signals to an information exchange port (e.g., an output port) of the carpooling request processing device 112. If the requester terminal 130 communicates with the carpooling request processing device 112 via a wired network, the information exchange port of the carpooling request processing device 112 may be physically connected to a cable, which may further transmit the electrical signals to an information exchange port (e.g., an input port) of the requester terminal 130. If the requester terminal 130 communicates with the carpooling request processing device 112 via a wireless network, the information exchange port of the carpooling request processing device 112 may be one or more antennas, which may convert the electrical signals to electromagnetic signals. Within an electronic device, such as the requester terminal 130, the provider terminal 140, or the server 110, when a processor thereof processes an instruction, sends out an instruction, and/or performs an action, the instruction and/or action is conducted via electrical signals. For example, when the processor retrieves or saves data from a storage medium (e.g., the storage device 150, the storage 220), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
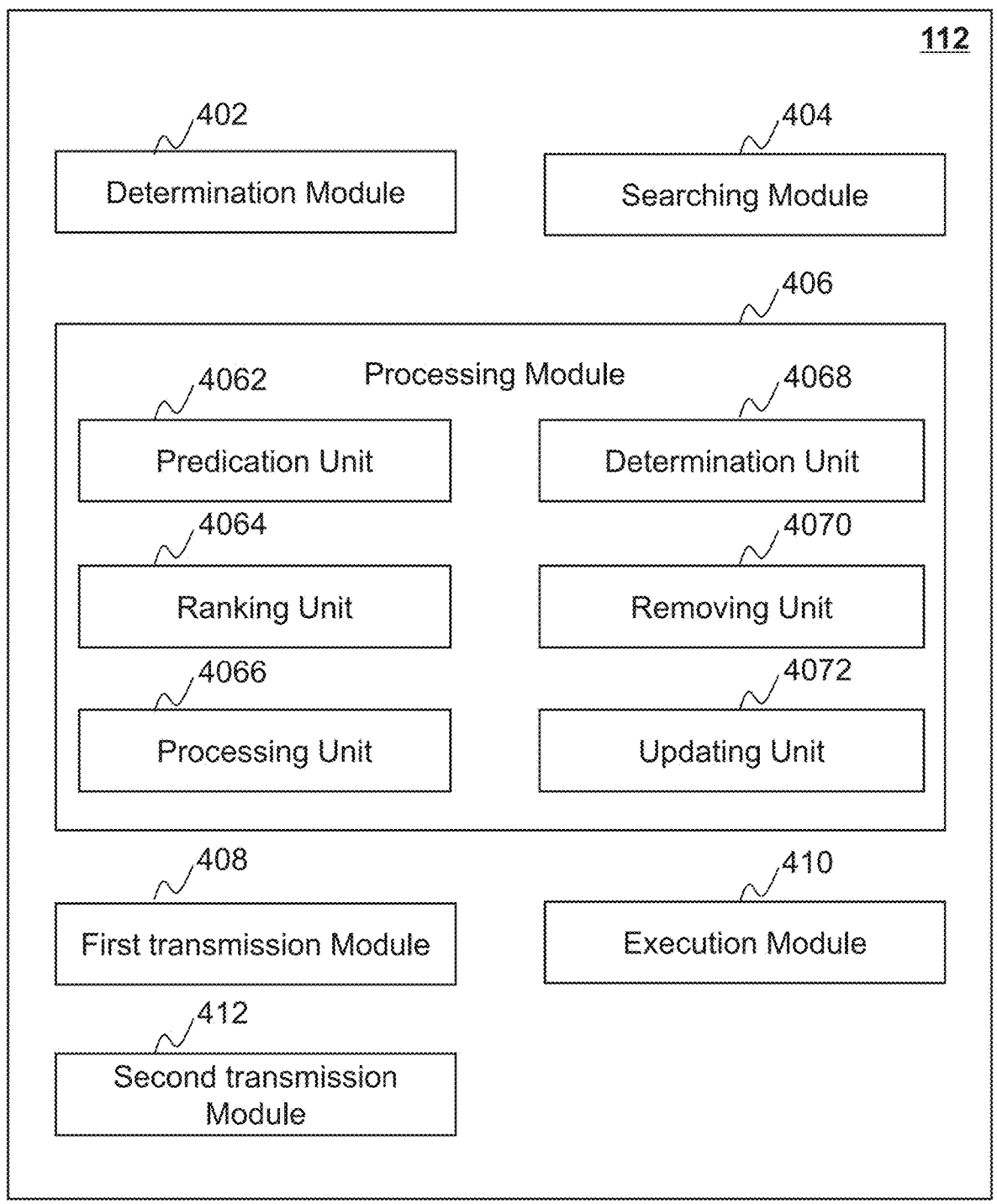
FIG. 4 is a block diagram illustrating an exemplary carpooling request processing device according to some embodiments of the present disclosure.

FIG. 4 is a block diagram illustrating an exemplary carpooling request processing device according to some embodiments of the present disclosure. The carpooling request processing device 112 may include a determination module 402, a searching module 404, a processing module 406, a first transmission module 408, an execution module 410, and a second transmission module 412. The processing module 406 may include a predication unit 4062, a ranking unit 4064, a processing unit 4066, a determination unit 4068, a removing unit 4070, and an updating unit 4072. At least a portion of the carpooling request processing device 112 may be implemented on a computing device illustrated in FIG. 2.

The determination module 402 may be configured to determine, when receiving a first service request from a first service requester, whether there is at least one second service requester that is combinative with the first service requester in a plurality of first candidate service requesters. In some embodiments, the second service requester may be associated with a second service request that is combinative with the first service request.

The searching module 404 may be configured to obtain travel information of the first service request in response to a determination that there is no the at least one second service requester, and determine, based on the travel information, a plurality of third service requesters that are different from the plurality of first candidate service requesters and meet a predetermined condition. The travel information may include the departure location, the departure time, the destination of the first service request, or the like, or any combination thereof. The third service requester may be a service requester that initiates no service request at the present moment but is potential to initiate a service request that is combinative with the first service request.

The processing module 406 may be configured to determine at least one target service requester from the plurality of third service requesters, and transmit a carpooling message to the at least one target service requester. In some embodiments, the carpooling message may be configured to trigger the at least one target service requester to initiate a third service request that is combinative with the first service request. The carpooling message may include the departure location, the departure time, the destination of the first service request, or the like, or any combination thereof. In some embodiments, the processing module 406 may transmit the carpooling message to a terminal (e.g., the requester terminal 130) associated with the at least one target service requester via a network (e.g., the network 120).

The prediction unit 4062 may be configured to determine a probability of a carpooling between the plurality of third service requesters with the first service requester. In some embodiments, the processing module 406 may determine the possibility of the carpooling using a predication model based on the number of historical requests that a third service requester has initiated, a distance between the historical/intended departure location and the departure location of the first service request, a difference between the historical/intended departure time and the departure time of the first service request, an angle between a direction from the historical/intended location to the historical/intended destination and a direction from the departure location to the destination of the first service request, or the like, or any combination thereof. For example, the closer a historical departure location of historical requests initiated by a third service requester within the region including the departure location of the first service request is, the higher the probability of the carpooling between the third service requester and the first service requester may be.

The ranking unit 4064 may be configured to rank the plurality of third service requesters based on the probability of the carpooling.

The processing unit 4066 may be configured to design a number of the plurality of third service requesters, successively starting with the highest probability based on the ranking or having the probability being greater than a second probability threshold (e.g., 50%, 60%, 70%, 80%, or 90%), as the at least one target service requester, and transmit the carpooling message to the at least one target service requester.

The determination unit 4068 may be configured to determine whether there is a target service requester that is willing to carpool with the first service requester in a preset time period (e.g., 1 minute, 2 minutes, 5 minutes). For example, the processing module 406 may determine whether there is a target service requester that transmits an agreement response to the carpooling message, or transmits a service request (e.g., the third service request) that is combinative with the first service request in the preset time period. In response to a determination that there is no target service requester that is willing to carpool with the first service requester, the removing unit 4070 may remove the at least one target service requester from the plurality of third service requesters, and repeat performing the processing operation until there is a service requester that is willing to carpool with the first service requester. In response to a determination that there is at least one target service requester that is willing to carpool with the first service requester, the processing module 406 may combine the first service requester with the target service requester that is the earliest one to allow combining with the first service requester.

The updating unit 4072 may be configured to design a new number of the plurality of third service requester as the at least one target service requester. The new number may be larger than an immediate-last number of the at least one target service requester, which may reduce the time for finding a service requester that is combinative with the first service requester.

In some embodiments, in response to the determination that there is no the at least one second service requester, before the searching module 404 obtains the travel information of the first service request, the first transmission module 408 may transmit, to the first service requester, a notice asking whether the first service requester is willing to wait for a second predetermined time period (e.g., 10 minutes) to allow the carpooling request processing device 112 find a service request that is combinative with the first service request. In response to a determination that the first service requester is willing to wait for the second predetermined time period to allow the carpooling request processing device 112 find a service request that is combinative with the first service request, the first transmission module 408 may perform operations 504 and 506. In response to a determination that the first service requester is not willing to wait for the second predetermined time period to allow the carpooling request processing device 112 find a service request that is combinative with the first service request, the execution module 410 may assign, to the first service requester, an idle service provider (e.g., a driver that is currently providing no service) and place the first service requester into the first candidate service requesters. In some embodiments, the first service requester may determine whether to wait for a certain period of time to allow the carpooling request processing device 112 find a service request that is combinative with the first service request based on his/her own choice, which improves the user experience.

In some embodiments, if the first service requester is willing to wait for the second predetermined time period to allow the carpooling request processing device 112 to find a service request that is combinative with the first service request, the second transmission module 412 may transmit one or more special offers (e.g., an electronic coupon of 2 dollars) to the first service requester. Alternatively, while the first transmission module 408 transmits the notice to the first service requester, the second transmission module 412 may transmit the one or more special offers to the first service requester. The one or more special offers may be compensation to the first service requester for the waiting time for a service request that is combinative with the first service request, and improve the transaction rate and user experience.

In some embodiments, the second transmission module 412 may transmit one or more special offers to the target service requester that is carpooled with the first service requester. Alternatively, while the processing module 406 transmit the carpooling message to the at least one target service requester, the second transmission module 412 may transmit the one or more special offers to the at least one target service requester. The one or more special offers may be configured to trigger the at least one target service requester to initiate a third service request that is combinative with the first service request.

In some embodiments, in response to a determination that there is no the at least one second service requester, during the time period between determining the plurality of third service requesters and determining that there is at least one service requester that is willing to carpool with the first service requester, the determination module 402 may continuously or periodically monitor the plurality of first candidate service requesters. If there is at least one second service requester that is combinative with the first service requester in the plurality of first candidate service requesters, the determination module 402 may combine the first service requester with the second service requester, and the process for determining a service requester to combine with the first service requester in the plurality of third service requesters may be terminated.

In some embodiments, if the number of the plurality of third service requesters is equal to or less than a third number threshold (e.g., 1, 2, 3, 5, 10, 15, 20), the process for determining the at least one target service requester may be omitted. The processing module 406 may transmit the carpooling message to the plurality of third service requesters. For example, the third number threshold may be equal to 3. The third service requesters determined in 504 may include the service requesters E and F. The process for determining the at least one target service requester in 506 may be omitted. The processing module 406 may transmit the carpooling message to the service requesters E and F. As another example, the third number threshold may be equal to 3. The third service requesters determined in 504 may include the service requesters E and F. The service requester F may be removed because the possibility of the carpooling is less than the first possibility threshold. The process for determining the at least one target service requester in 506 may be omitted. The processing module 406 may transmit the carpooling message to the service requesters E.

In the process for determining combinative service requesters in this present, the server 110 may search for a target service requester that is currently initiating no service request but has a potential to initiate a service request combinative with the first service request, which improves the carpooling transaction rate. Additionally, the target service requester may determine whether to combine with the first service requester based on his/her own choice, and the first service requester may determine whether to wait for a certain time period to allow the server 110 find a combinative service requester based on his/her own choice, which improves the user experience.

The modules and/or units in the carpooling request processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the first transmission module 408 may be integrated with the second transmission module 412 as a single module which may transmit a notice and/or one or more electronic coupons to the first service requester. As another example, the searching module 404 may be divided into two units. The first unit may be configured to obtain the travel information of the first service request of the first service requester in response to the determination that there is no the at least one second service requester. The second unit may be configured to determine, based on the travel information, the plurality of third service requesters.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the carpooling request processing device 112 may further include a storage module (not shown in FIG. 4). The storage module may be configured to store data generated during any process performed by any component of in the carpooling request processing device 112. As another example, each of components of the carpooling request processing device 112 may include a storage device. Additionally or alternatively, the components of the carpooling request processing device 112 may share a common storage device.

FIG. 5 is a flowchart illustrating an exemplary process for determining combinative service requesters according to some embodiments of the present disclosure. The process 500 may be implemented in the online to offline service system 100 illustrated in FIG. 1. For example, the process 500 may be stored in the storage device 150 and/or the storage 220 as a form of instructions (e.g., an application), and invoked and/or executed by the server 110 (e.g., the carpooling request processing device 112 of the server 110, the processor 220 illustrated in FIG. 2, or one or more modules in the carpooling request processing device 112 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In this disclosure, a carpooling service of combining two transportation services into a new transportation service is taken for example. It should be noted that the carpooling service of combining two transportation services into a new transportation service is merely provided for the purposes of illustration, and not intended to limit the scope of the present disclosure. In some embodiments, this disclosure may be applied to a carpooling service of combining more than two transportation services into a new transportation service.

In 502, the determination module 402 (or the carpooling request processing device 112, and/or the processing circuits 210-b) may determine, when receiving a first service request from a first service requester, whether there is at least one second service requester that is combinative with the first service requester in a plurality of first candidate service requesters. In some embodiments, the second service requester may be associated with a second service request that is combinative with the first service request.

In some embodiments, the requester terminal 130 and/or the provider terminal 140 may establish a communication (e.g., wireless communication) with the server 110, through an application (e.g., the application 380 in FIG. 3) installed in the requester terminal 130 and/or the provider terminal 140 via the network 120. The application may associate with the online to offline service system 100. For example, the application may be a taxi-hailing application associated with the online to offline service system 100.

In some embodiments, a service request may refer to information of a transportation service that is formally requested and sent out by a service requester to the server 110 via the requester terminal 130. For example, when the service requester sends out the information of the transportation service to the server 110, the service requester may do so by pressing a button on the interface of the application installed in the requester terminal 130. Upon receiving the information of the transportation service, the server 110 may determine that the information of the transportation service is formally sent out and determine the information of the transportation service as a service request.

In some embodiments, the first service request may include a departure time, a departure location, a destination, or the like, or any combination thereof. In some embodiments, the first service request may be a carpooling request indicating that the first service requester is willing to share a service provider (e.g., a driver) with other service requesters. In some embodiments, the determination module 402 may receive the service request from a terminal (e.g., the requester terminal 130) associated with the first service requester via a network (e.g., the network 120).

In some embodiments, the first service request may be a real-time request that the first service requester wishes to receive an online to offline service (e.g., a taix-hailing service) at the present moment or at a defined time (e.g., 1 minute, 2 minutes, or 5 minutes after the present moment) reasonably close to the present moment for an ordinary person in the art, so that a service provider is required to depart immediately or substantially immediately after the online to offline service system 100 receives the first service request.

In some embodiments, the first service request may be a service request that needs an appointment, which indicates that the first service requester wishes to receive the online to offline service at a time reasonably long from the present moment for the ordinary person in the art, so that a service provider is not required to depart immediately or substantially immediately after the online to offline service system 100 receives the first service request. For example, a passenger may need to reserve a taxi service if the time interval between the current time and the service time (e.g., the departure time) is longer than a time threshold (e.g., 10 minutes, 20 minutes, 2 hours, or 1 day).

In some embodiments, the departure location and/or the destination may be a specified location input by a service requester through the requester terminal 130 (e.g., the I/O 350 in FIG. 3). In some embodiments, the requester terminal 130 may automatically obtain the departure location and/or the destination. For example, an event such as "A meeting at location A at 10:00 a.m. on Wednesday" is recorded in a calendar in the requester terminal 130. The requester terminal 130 may automatically determine location A as the destination based on the event in the calendar. In some embodiments, the requester terminal 130 may obtain its location (which is referred to as the location of the service requester) herein through a positioning technology in the requester terminal 130, for example, the GPS, GLONASS, COMPASS, QZSS, BDS, WiFi positioning technology, or the like, or any combination thereof.

In some embodiments, each of the plurality of first candidate service requesters may be associated with a pending request. The pending request may be a carpooling request that has not been completed and is waiting for a combinative service request. The pending request may be a service request that has been or has not been accepted by a service provider (e.g., a driver). In some embodiments, the carpooling request processing device 112 may obtain the pending requests associated with the plurality of first candidate service requesters from a storage medium (e.g., the storage device 150, the storage 220 of the carpooling request processing device 112, a storage module of the carpooling request processing device 112).

In some embodiments, the determination module 402 may determine whether there is at least one second service requester that is combinative with the first service requester in the plurality of first candidate service requesters based on the departure times, the departure locations, or the destinations of the first service request and the pending requests. For example, for each of the plurality of first candidate service requesters, the determination module 402 may determine whether a departure location or a current location of the first candidate service requester is within a distance threshold (e.g., 2500 km) away from the departure location of the first service requester, whether an estimated travel time from the departure location or the current location of the first candidate service requester to the departure location of the first service requester is within a time interval threshold (e.g., 5 minutes), and whether an angle between the direction from the departure location or the current location to the destination of the first candidate service requester and that from the departure location to the destination of the first service requester is less than an angle threshold (e.g., ±30°). In response to a determination that the departure location or the current location of the second candidate service requester is within the distance thresholds the determination module 402 may determine that the first candidate service requester is a second service requester that is combinative with the first service requester. If the first service requester initiated a service request that needs an appointment, the determination module 402 may further determine whether the difference between the departure times of the first service requester and the first candidate service requester is less than a difference threshold (e.g., 10 minutes). In response to a determination that the difference between the departure times of the first service requester and the first candidate service requester is less than the difference threshold, the determination module 402 may determine that the first candidate service requester is a second service requester that is combinative with the first service requester.

In some embodiments, if there is one second service requester, the carpooling request processing device 112 may combine the second service requester with the first service requester. If there are two or more second service requesters, the carpooling request processing device 112 may select one of the two or more second service requesters to combine with the first service requester. For example, the carpooling request processing device 112 may randomly select one of the two or more second service requesters to combine with the first service requester. As another example, the carpooling request processing device 112 may select a service requester of which the departure location or the current location is closest to the departure location of the first service requester among the two or more second service requesters to combine with the first service requester.

In 504, the searching module 404 (or the carpooling request processing device 112, and/or the processing circuits 210-*b*) may obtain travel information of the first service request in response to a determination that there is no the at least one second service requester, and determine, based on the travel information, a plurality of third service requesters that are different from the plurality of first candidate service requesters and meet a predetermined condition. The travel information may include the departure location, the departure time, the destination of the first service request, or the like, or any combination thereof. The third service requester may be a service requester that initiates no service request at the present moment but is potential to initiate a service request that is combinative with the first service request.

In some embodiments, the searching module 404 may obtain a plurality of second candidate service requesters different from the plurality of first candidate service requesters and then select, from the plurality of second candidate service requesters, the plurality of third service requesters based on the predetermined condition. The second candidate service requester may be a service requester that initiates no service request at the present moment (e.g., the time when the carpooling request processing device 112 receives the first service request).

The predetermined condition may include that each of the plurality of third service requesters has initiated a first predetermined number of historical requests for a historical departure location being within a region including the departure location of the first service request, and/or for a historical departure time being within a predetermined time interval including the departure time of the first service request. The first predetermined number is greater than a first number threshold (e.g., 0, 1, 2, 5, 10, 20). In some embodiments, the historical request may refer to a service request that has been completed by a service provider or has been canceled by a service provider or a service requester. Alternatively or additionally, for each of the first predetermined number of historical requests, an angle between the direction from the departure location to the destination of the first service request and that from the historical departure location to the historical destination of the historical request may be less than the angle threshold.

Alternatively or additionally, the predetermined condition may include that each of the plurality of third service requesters allows to be transmitted a carpooling message and/or have historical receipt of a second predetermined number of the carpooling messages in a first predetermined time period (e.g., a day, a week). The second predetermined number is less than a second number threshold (e.g., 0, 1, 2, 5, 10, 20). For example, the processing module 406 may transmit at most 3 carpooling message to a service requester one day. In some embodiments, the second predetermined number, the first predetermined time period, or the second number threshold may be set by the third service requester or default of the online to offline service system 100.

Alternatively or additionally, the third service requester may initiate a service intention at the present moment or at a defined time (e.g., 1 minute, 2 minutes, or 5 minutes before the present moment) reasonably close to the present moment (e.g., the time when the carpooling request processing device 112 receives the first service request) for an ordinary person in the art. The service intention may indicate an interest in requesting an online to offline service. In certain embodiments, the service intention reflects a likelihood that a service request is made before it is actually being made. Merely by way of example, the application installed in the requester terminal 130 may direct the requester terminal 130 to monitor, continuously or periodically, input from a service requester and transmit the input to the online to offline service system 100 via the network 120. Consequently, the requester terminal 130 may inform the online to offline service system 100 about the service requester's input in real-time or substantially real-time. As a result, when the service requester starts to input a departure location, a departure time, or a destination, the online to offline service system 100 may receive enough information to determine an intention of the service requester. For example, when the service requester inputs all or part of a departure location, and before sending out the departure location to the online to offline service system 100, the online to offline service system 100 may have already received the departure location, and determine that the service requester intends to initiate a service request.

In some embodiments, the intended departure location of the service intention initiated by the third service requester may be within the region including the departure location of the first service request. Alternatively or additionally, the intended departure time of the service intention initiated by the third service requester may be within the predetermined time interval including the departure time of the first service request. Alternatively or additionally, an angle between the direction from the departure location to the destination of the first service request and that from the intended departure location to the intended destination of the service intention initiated by the third service requester may be less than the angle threshold.

In some embodiments, the searching module 404 may determine the region including the departure location of the first service request by performing a Geohash algorithm, determining a circle region that is centered at the departure location of the first service request and with a radius of a predetermined value, or determining a rectangle region including the departure location of the first service request.

The Geohash algorithm encodes a geographic location (e.g., longitude and latitude coordinates) into a string of letters and digits, which is a hierarchical spatial data structure that represents a region of grid shape. The greater the number of letters and digits is, the smaller the size of the region may be. For example, WX4DY represents a larger region than the region represented by WX4D. The more similar two strings of letters and digits are, the smaller the distances between the two strings of letters and digits may be. For example, the distance between a region related to WX4DY and a region related to WX4GA may be greater than the distance between a region related to WX4DY and a region related to WX4DX.

Merely by way of example, the time when the carpooling request processing device 112 receives the first service request is 5:50 p.m. on May 11. The searching module 404 may obtain a string of letters and digits (e.g., WX4DY) related to the departure location of the first service request using the Geohash algorithm. The searching module 404 may then search service requesters that have initiated at least one historical request for a historical departure location within the region related to WX4DY based on inverted index and obtain a preliminary searching result including, for example, the service requesters C, D, E, F, G, and H. The searching module 404 may remove the service requester C that does not allow to be transmitted the carpooling message and the service requester D that have received a plurality of carpooling messages of which the number is equal to or greater than the second number threshold in the first predetermined time period (e.g., in the past week). The searching module 404 may analyze historical requests of the service requesters E, F, G, and H. If the carpooling request processing device 112 receives a service intention including a departure location of International Business Machine (IBM) building (e.g., the IBM building is 1 km away from the departure location of the first service request and is located in the region related to WX4DY) and a destination same as the destination of the first service requester from the service requester E at 5:45 p.m. on May 11, the searching module 404 may keep the service requester E. If the service requester F have initiated 20 historical requests each of which includes a departure location that is 1 km away from the departure location of the first service request and is located in the region of WX4DY, and a departure time of 6:00 p.m. that is within the predetermined time interval (e.g., 20 minutes) including the departure time of the first service request in the past month, the searching module 404 may keep the service requester F. If the service requesters G and H have not initiated any historical requests for a historical departure location being within the region related to WX4DY and the regions adjacent to the region related to WX4DY, and the carpooling request processing device 112 receives no service intention from the service requesters G and H at a defined time (e.g., 1 minute, 2 minutes, or 5 minutes before 5:40 p.m. on May 11) reasonably close to 5:40 p.m. on May 11 for an ordinary person in the art, the searching module 404 may remove the service requesters G and H and determine the service requesters E and F as the third service requesters.

In 506, the processing module 406 (or the carpooling request processing device 112, and/or the processing circuits 210-b) may determine at least one target service requester from the plurality of third service requesters, and transmit a carpooling message to the at least one target service requester. In some embodiments, the carpooling message may be configured to trigger the at least one target service requester to initiate a third service request that is combinative with the first service request. The carpooling message may include the departure location, the departure time, the destination of the first service request, or the like, or any combination thereof. In some embodiments, the processing module 406 may transmit the carpooling message to a terminal (e.g., the requester terminal 130) associated with the at least one target service requester via a network (e.g., the network 120).

In some embodiments, the processing module 406 may determine the at least one target service requester by performing a prediction operation, a ranking operation, and a processing operation.

In the prediction operation, the processing module 406 (the carpooling request processing device 112 and/or the processing circuits 210-b, or the prediction unit 4062) may determine a probability of a carpooling between the plurality of third service requesters with the first service requester. In some embodiments, the processing module 406 may determine the possibility of the carpooling using a predication model based on the number of historical requests that a third service requester has initiated, a distance between the historical/intended departure location and the departure location of the first service request, a difference between the historical/intended departure time and the departure time of the first service request, an angle between a direction from the historical/intended location to the historical/intended destination and a direction from the departure location to the destination of the first service request, or the like, or any combination thereof. For example, the closer a historical departure location of historical requests initiated by a third service requester within the region including the departure location of the first service request is, the higher the probability of the carpooling between the third service requester and the first service requester may be.

In the ranking operation, the processing module 406 (the carpooling request processing device 112 and/or the processing circuits 210-b, or the ranking unit 4064) may rank the plurality of third service requesters based on the probability of the carpooling.

Alternatively or additionally, the processing module 406 may remove the third service requesters of which the possibilities of the carpooling are less than a first possibility threshold (e.g., 10%, 20%, 30%, 40%, or 50%).

In the processing operation, the processing module 406 (the carpooling request processing device 112 and/or the processing circuits 210-*b*, or the processing unit 4066) may design a number of the plurality of third service requesters, successively starting with the highest probability based on the ranking or having the probability being greater than a second probability threshold (e.g., 50%, 60%, 70%, 80%, or 90%), as the at least one target service requester, and transmit the carpooling message to the at least one target service requester.

In some embodiments, the operation of transmitting the carpooling message to the third service requesters associated with a relatively higher possibility of the carpooling may improve the carpooling transaction rate.

In some embodiments, the processing module 406 may also transmit personal information related to the first service requester to the at least one target service requester along with the carpooling message. The personal information related to the first service requester may include a Wechat™ account, a microblog account, personal interests, gender, occupation, or the like, or any combination thereof. According to the personal information related to the first service requester, the at least one target service requester may learn more about the first service requester, and the at least one target service requester determines whether to carpool with the first service requester based on the at least one target service requester's own choice, so that the success rate of the carpooling and the carpooling efficiency may be further improved.

In some embodiments, after transmitting the carpooling message to the at least one target service requester, the processing module 406 (the carpooling request processing device 112 and/or the processing circuits 210-*b*, or the determination unit 4068) may determine whether there is a target service requester that is willing to carpool with the first service requester in a preset time period (e.g., 1 minute, 2 minutes, 5 minutes). For example, the processing module 406 may determine whether there is a target service requester that transmits an agreement response to the carpooling message, or transmits a service request (e.g., the third service request) that is combinative with the first service request in the preset time period. In response to a determination that there is no target service requester that is willing to carpool with the first service requester, the processing module 406 (the carpooling request processing device 112 and/or the processing circuits 210-*b*, or the removing unit 4070) may remove the at least one target service requester from the plurality of third service requesters, and repeat performing the processing operation until there is a service requester that is willing to carpool with the first service requester. In response to a determination that there is at least one target service requester that is willing to carpool with the first service requester, the processing module 406 may combine the first service requester with the target service requester that is the earliest one to allow combining with the first service requester.

In some embodiments, the processing module 406 may transmit the carpooling message to the at least one target service requester one by one in descending order according to the possibility of the carpooling. For example, the processing module 406 may first transmit the carpooling message to a first target service requester associated with the highest possibility of the carpooling. If the processing module 406 receives no response to the carpooling message, receives a rejection response to the carpooling message, or receives a service request that is not combinative with the first service request from the first target service requester in the preset time period, the processing module 406 may transmit the carpooling message to a second target service requester associated with the second-highest possibility of the carpooling. If the processing module 406 receives an agreement response to the carpooling message, or receives a service request (e.g., a third service request) that is combinative with the first service request from the second target service requester in the preset time period, the processing module 406 may combine the first service requester with the second target service requester and not transmit the carpooling message to the rest of target service requesters.

In some embodiments, the processing module 406 may transmit the carpooling message to the at least one target service requester simultaneously. The processing module 406 may combine the first service requester with the target service requester that is the earliest one to allow combining with the first service requester (e.g., transmit an agreement response or transmit a service request that is combinative with the first service request) in the preset time period.

In some embodiments, when repeating performing the processing operation, the processing module 406 (the carpooling request processing device 112 and/or the processing circuits 210-*b*, or the updating unit 4072) may design a new number of the plurality of third service requester as the at least one target service requester. The new number may be larger than an immediate-last number of the at least one target service requester, which may reduce the time for finding a service requester that is combinative with the first service requester.

Merely by way of example, the processing module 406 may transmit the carpooling message to three target service requesters associated with the top three highest possibility of the carpooling. If the processing module 406 receives no response, a rejection response, or a service request that is not combinative with the first service request from the three target service requesters in 5 minutes, the processing module 406 may repeat performing the processing operation to select another six target service requesters from the plurality of third service requesters.

In some embodiments, if there is no service requester that is willing to carpooled with the first service requester in the plurality of third service requesters, the execution module 410 (or the carpooling request processing device 112, and/or the processing circuits 210-*b*) may assign, to the first service requester, an idle service provider (e.g., a driver that is currently providing no service) and place the first service requester into the first candidate service requesters.

In some embodiments, in response to the determination that there is no the at least one second service requester, before the searching module 404 obtains the travel information of the first service request, the first transmission module 408 (or the carpooling request processing device 112, and/or the interface circuits 210-*a*) may transmit, to the first service requester, a notice asking whether the first service requester is willing to wait for a second predetermined time period (e.g., 10 minutes) to allow the carpooling request processing device 112 find a service request that is combinative with the first service request. In response to a determination that the first service requester is willing to wait for the second predetermined time period to allow the carpooling request processing device 112 find a service request that is combinative with the first service request, the first transmission module 408 may perform operations 504 and 506. In response to a determination that the first service requester is not willing to wait for the second predetermined time period to allow the carpooling request processing device 112 find a service request that is combinative with the first service request, the execution module 410 (or the carpooling request processing device 112, and/or the processing circuits 210-b) may assign, to the first service requester, an idle service provider (e.g., a driver that is currently providing no service) and place the first service requester into the first candidate service requesters. In some embodiments, the first service requester may determine whether to wait for a certain period of time to allow the carpooling request processing device 112 find a service request that is combinative with the first service request based on his/her own choice, which improves the user experience.

In some embodiments, if the first service requester is willing to wait for the second predetermined time period to allow the carpooling request processing device 112 to find a service request that is combinative with the first service request, the second transmission module 412 (or the carpooling request processing device 112, and/or the interface circuits 210-a) may transmit one or more special offers (e.g., an electronic coupon of 2 dollars) to the first service requester. Alternatively, while the first transmission module 408 transmits the notice to the first service requester, the second transmission module 412 may transmit the one or more special offers to the first service requester. The one or more special offers may be compensation to the first service requester for the waiting time for a service request that is combinative with the first service request, and improve the transaction rate and user experience.

In some embodiments, the second transmission module 412 may transmit one or more special offers to the target service requester that is carpooled with the first service requester. Alternatively, while the processing module 406 transmit the carpooling message to the at least one target service requester, the second transmission module 412 may transmit the one or more special offers to the at least one target service requester. The one or more special offers may be configured to trigger the at least one target service requester to initiate a third service request that is combinative with the first service request.

In some embodiments, in response to a determination that there is no the at least one second service requester, during the time period between determining the plurality of third service requesters and determining that there is at least one service requester that is willing to carpool with the first service requester, the determination module 402 may continuously or periodically monitor the plurality of first candidate service requesters. If there is at least one second service requester that is combinative with the first service requester in the plurality of first candidate service requesters, the determination module 402 may combine the first service requester with the second service requester, and the process for determining a service requester to combine with the first service requester in the plurality of third service requesters may be terminated.

In some embodiments, if the number of the plurality of third service requesters is equal to or less than a third number threshold (e.g., 1, 2, 3, 5, 10, 15, 20), the process for determining the at least one target service requester may be omitted. The processing module 406 may transmit the carpooling message to the plurality of third service requesters. For example, the third number threshold may be equal to 3. The third service requesters determined in 504 may include the service requesters E and F. The process for determining the at least one target service requester in 506 may be omitted. The processing module 406 may transmit the carpooling message to the service requesters E and F. As another example, the third number threshold may be equal to 3. The third service requesters determined in 504 may include the service requesters E and F. The service requester F may be removed because the possibility of the carpooling is less than the first possibility threshold. The process for determining the at least one target service requester in 506 may be omitted. The processing module 406 may transmit the carpooling message to the service requesters E.

In the process for determining combinative service requesters in this present, the server 110 may search for a target service requester that is currently initiating no service request but has a potential to initiate a service request combinative with the first service request, which improves the carpooling transaction rate. Additionally, the target service requester may determine whether to combine with the first service requester based on his/her own choice, and the first service requester may determine whether to wait for a certain time period to allow the server 110 find a combinative service requester based on his/her own choice, which improves the user experience.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
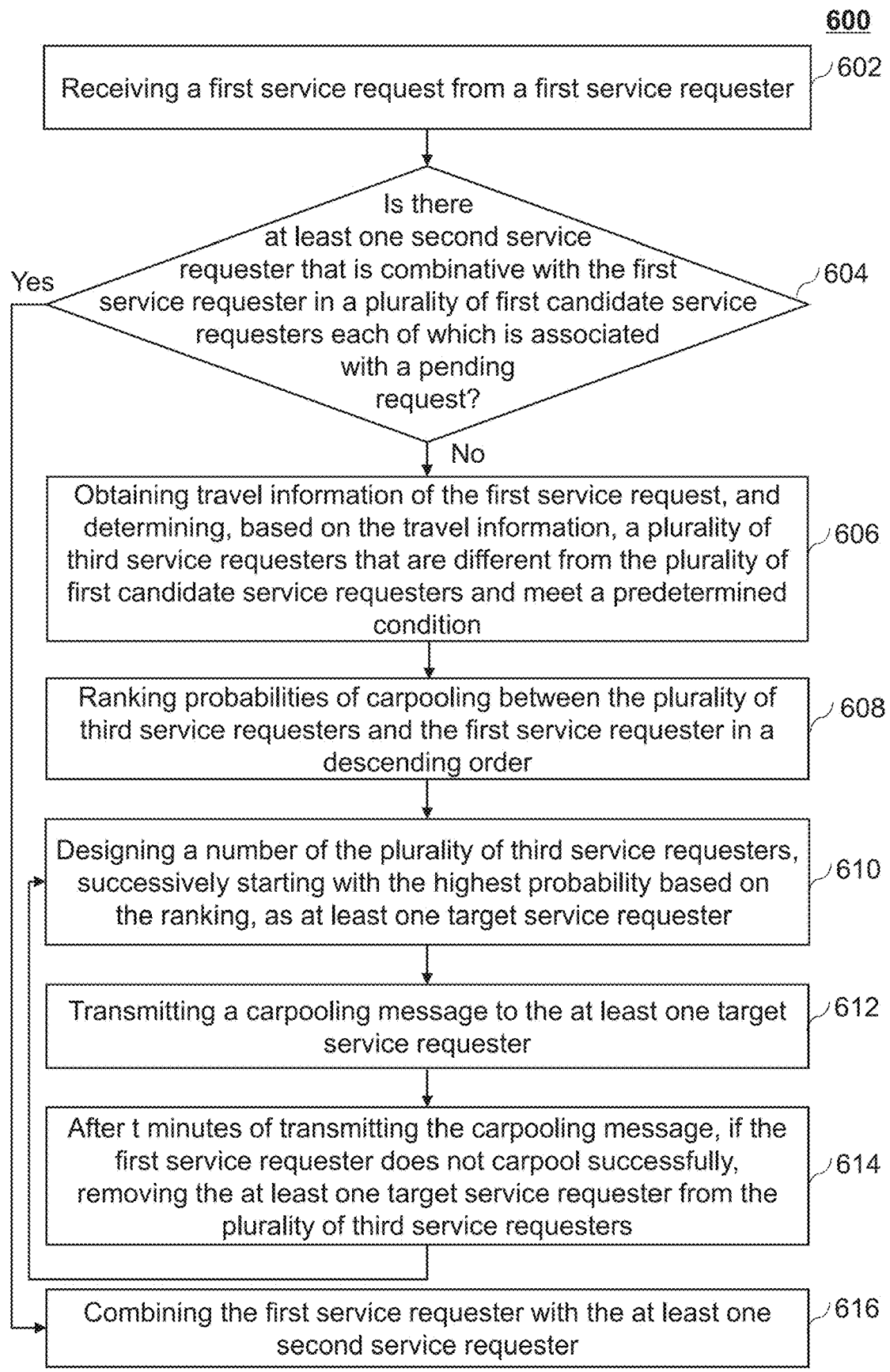
FIG. 6 is a flowchart illustrating an exemplary process for determining combinative service requesters according to some embodiments of the present disclosure.

FIG. 6 is a flowchart illustrating an exemplary process for determining combinative service requesters according to some embodiments of the present disclosure. The process 600 may be implemented in the online to offline service system 100 illustrated in FIG. 1. For example, the process 500 may be stored in the storage device 150 and/or the storage 220 as a form of instructions (e.g., an application), and invoked and/or executed by the server 110 (e.g., the carpooling request processing device 112 of the server 110, the processor 220 illustrated in FIG. 2, or one or more modules in the carpooling request processing device 112 illustrated in FIG. 4). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the determination module 402 (or the carpooling request processing device 112, and/or the processing circuits 210-b) may receive a first service request from a first service requester. In some embodiments, the first service request may be a carpooling request.

In 604, the determination module 402 (or the carpooling request processing device 112, and/or the processing circuits 210-b) may determine whether there is at least one second service requester that is combinative with the first service requester in a plurality of first candidate service requesters each of which is associated with a pending request.

In response to a determination that there is at least one second service requester, the process 600 may proceed to 616 to combine the first service requester with the at least one second service requester. In some embodiments, if there is one second service requester, the carpooling request processing device 112 may combine the second service requester with the first service requester. If there are two or more second service requesters, the carpooling request processing device 112 may select one of the two or more second service requesters to combine with the first service requester. For example, the carpooling request processing device 112 may randomly select one of the two or more second service requesters to combine with the first service requester. As another example, the carpooling request processing device 112 may select a service requester of which the departure location or the current location is the closest to the departure location of the first service requester among the two or more second service requesters to combine with the first service requester.

In response to a determination that there is no the at least one second service requester, the process 600 may proceed to 606.

In 606, the searching module 404 (or the carpooling request processing device 112, and/or the processing circuits 210-b) may obtain travel information of the first service request, and determine, based on the travel information, a plurality of third service requesters that are different from the plurality of first candidate service requesters and meet a predetermined condition. The travel information may include the departure location, the departure time, the destination of the first service request, or the like, or any combination thereof. Details regarding the predetermined condition may be found elsewhere in the present disclosure (e.g., the description in connection with FIG. 5)

In 608, the processing module 406 (or the carpooling request processing device 112, and/or the processing circuits 210-b) may rank the plurality of third service requesters in a descending order of probabilities of a carpooling between the plurality of third service requesters and the first service requester.

In 610, the processing module 406 (or the carpooling request processing device 112, and/or the processing circuits 210-b) may design a number of the plurality of third service requesters, successively starting with the highest probability based on the ranking, as at least one target service requester.

In 612, the processing module 406 (or the carpooling request processing device 112, and/or the processing circuits 210-b) may transmit a carpooling message to the at least one target service requester. The carpooling message may trigger the at least one target service requester to initiate a service request that is combinative with the first service request.

In 614, after a preset time period (e.g., five minutes) of transmitting the carpooling message, if the first service requester does not carpool successively, the processing module 406 (or the carpooling request processing device 112, and/or the processing circuits 210-b) may remove the at least one target service requester from the plurality of third service requesters. The process 600 may return back to operation 610 to repeat performing operations 610-614, until the first service requester carpools successively.

In some embodiments, each time repeating the operation 610, the processing module 406 may result in a new number of the plurality of third service requester as the at least one target service requester. The new number is larger than an immediate-last number of the at least one target service requester. For example, the processing module 406 may determine three target service requesters for the first time performing the operation 610, determine six target service requesters for the second time performing the operation 610, and determine nine target service requesters the third time performing the operation 610.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system for determining combinative service requesters, comprising:
   one or more storage media comprising a set of instructions; and
   one or more processors configured to communicate with the one or more storage media, wherein when executing the set of instructions, the one or more processors are directed to cause the system to:
   (1) receive a first service request from a first service requester, the first service request including a departure time, a departure location, and a destination;
   (2) obtain a plurality of first candidate service requesters, each of which is associated with a pending request;
   (3) determine whether there is at least one second service requester associated with a second service request that is combinative with the first service request in the plurality of first candidate service requesters;
   (4) select, among a plurality of second candidate service requesters, a plurality of third service requesters in response to a determination that there is no the at least one second service requester, the second candidate service requester being a service requester that initiates no service request at the present moment and the plurality of third service requesters different from the plurality of first candidate service requesters;
   (5) determine at least one target service requester from the plurality of third service requesters; and
   (6) transmit a carpooling message to the at least one target service requester to initiate a third service request that is combinative with the first service request.

2. The system of claim 1, wherein to determine the plurality of third service requesters, the one or more processors are directed to cause the system to:
   obtain a plurality of second candidate service requesters different from the plurality of first candidate service requesters; and
   wherein each of the plurality of third service requesters, has initiated a first predetermined number of historical requests for a historical departure location being within a region including the departure location, and/or for a historical departure time being within a predetermined time interval including the departure time, wherein the first predetermined number is greater than a first number threshold; and/or
   wherein each of the plurality of third service requesters allows to be transmitted the carpooling message and/or have historical receipt of a second predetermined number of the carpooling messages in a first predetermined time period, wherein the second predetermined number is less than a second number threshold.

3. The system of claim 2, wherein to determine the region including the departure location, the one or more processors are directed to cause the system to perform at least one of the following operations:
performing a Geohash algorithm to determine the region including the departure location;
determining a circle region that is centered at the departure location and with a radius of a predetermined value; or
determining a rectangle region including the departure location.

4. The system of claim 1, wherein to determine the at least one target service requester, the one or more processors are further directed to cause the system to:
(1) determine a probability of a carpooling between the plurality of third service requesters with the first service requester;
(2) rank the probability of the carpooling; and
(3) design a number of the plurality of third service requesters, successively starting with the highest probability based on the ranking or having the probability being greater than a probability threshold, as the at least one target service requester.

5. The system of claim 4, wherein when executing the set of instructions, the one or more processors are further directed to cause the system to:
after the carpooling message is transmitted to the at least one target service requester, determine whether the third service request is initiated; and
if the third service request is not initiated; remove the at least one target service requester from the plurality of third service requesters and repeat operation (3) in claim 4.

6. The system of claim 5; wherein to repeat operation (3) in claim 4 results in a new number of the plurality of third service requesters as the at least one target service requester; wherein the new number is larger than an immediate-last number of the at least one target service requester.

7. The system of claim 1, wherein when executing the set of instructions, the one or more processors are further directed to cause the system to:
transmit, to the first service requester, a notice asking whether the first service requester is willing to wait for a second predetermined time period to allow the one or more processors find a request that is combinative with the first service request;
determine that the first service requester is willing to wait for the second predetermined time period based on a response to the notice from the first service requester, then execute operations (4)-(6) in claim 1, or otherwise, assign a service provider to the first service requester and place the first service requester into the first candidate service requesters.

8. The system of claim 1, wherein when executing the set of instructions, the one or more processors are further directed to cause the system to:
send personal information of the first service requester to the at least one target service requester.

9. The system of claim 1, wherein when executing the set of instructions, the one or more processors are further directed to cause the system to:
transmit one or more coupons to the first service requester or the at least one target service requester.

10. A method for determining combinative service requesters implemented on a computing device having one or more processors and one or more storage media, the method comprising:
(1) receiving a first service request from a first service requester, the first service request including a departure time, a departure location, and a destination;
(2) obtaining a plurality of first candidate service requesters, each of which is associated with a pending request;
(3) determining whether there is at least one second service requester associated with a second service request that is combinative with the first service request in the plurality of first candidate service requesters;
(4) selecting, among the plurality of second candidate service requesters, the plurality of third service requesters; the second candidate service requester being a service requester that initiates no service request at the present moment; determining the plurality of third service requesters different from the plurality of first candidate service requesters in response to a determination that there is no the at least one second service requester;
(5) determining at least one target service requester from the plurality of third service requesters; and
(6) transmitting a carpooling message to the at least one target service requester to initiate a third service request that is combinative with the first service request.

11. The method of claim 10, wherein the determining of the plurality of third service requesters includes:
obtaining a plurality of second candidate service requesters different from the plurality of first candidate service requesters; and
wherein each of the plurality of third service requesters, has initiated a first predetermined number of historical requests for a historical departure location being within a region including the departure location, and/or for a historical departure time being within a predetermined time interval including the departure time, wherein the first predetermined number is greater than a first number threshold; and/or
wherein each of the plurality of third service requesters allows to be transmitted the carpooling message and/or have historical receipt of a second predetermined number of the carpooling messages in a first predetermined time period, wherein the second predetermined number is less than a second number threshold.

12. The method of claim 11, wherein the determining of the region including the departure location includes at least one of the following operations:
performing a Geohash algorithm to determine the region including the departure location;
determining a circle region that is centered at the departure location and with a radius of a predetermined value; or
determining a rectangle region including the departure location.

13. The method of claim 10, wherein the determining of the at least one target service requester includes;
(1) determining a probability of a carpooling between the plurality of third service requesters with the first service requester;
(2) ranking the probability of the carpooling; and
(3) designing a number of the plurality of third service requesters, successively starting with the highest probability based on the ranking or having the probability being greater than a probability threshold, as the at least one target service requester.

14. The method of claim 13, the method further comprising:
after the carpooling message is transmitted to the at least one target service requester, determining whether the third service request is initiated; and
if the third service request is not initiated, removing the at least one target service requester from the plurality of third service requesters and repeating operation (3) in claim 13.

15. The method of claim 14, wherein to repeat operation (3) in claim 13 results in a new number of the plurality of third service requesters as the at least one target service requester, wherein the new number is larger than an immediate-last number of the at least one target service requester.

16. The method of claim 10, the method further comprising: transmitting, to the first service requester, a notice asking whether the first service requester is willing to wait for a second predetermined time period to allow the one or more processors find a request that is combinative with the first service request;
determining that the first service requester is willing to wait for the second predetermined time period based on a response to the notice from the first service requester, then execute operations (4)-(6) in claim 10, or
otherwise, assigning a service provider to the first service requester and place the first service requester into the first candidate service requesters.

17. The method of claim 10, the method further comprising: sending personal information of the first service requester to the at least one target service requester.

18. The method of claim 10, the method further comprising: transmitting one or more coupons to the first service requester or the at least one target service requester.

19. A non-transitory computer readable medium, comprising at least one set of instructions for determining combinative service requesters, wherein when executed by one or more processors of a computing device, the at least one set of instructions causes the computing device to perform a method, the method comprising:
(1) receiving a first service request from a first service requester, the first service request including a departure time, a departure location, and a destination;
(2) obtaining a plurality of first candidate service requesters, each of which is associated with a pending request;
(3) determining whether there is at least one second service requester associated with a second service request that is combinative with the first service request in the plurality of first candidate service requesters;
(4) select, among a plurality of second candidate service requesters, a plurality of third service requesters in response to a determination that there is no the at least one second service requester, the second candidate service requester being a service requester that initiates no service request at the present moment and; the plurality of third service requesters different from the plurality of first candidate service requesters;
(5) determining at least one target service requester from the plurality of third service requesters; and
(6) transmitting a carpooling message to the at least one target service requester to initiate a third service request that is combinative with the first service request.

20. The non-transitory computer readable medium of claim 19, wherein the determining of the plurality of third service requesters includes:
obtaining a plurality of second candidate service requesters different from the plurality of first candidate service requesters; and
selecting, among the plurality of second candidate service requesters, the plurality of third service requesters;
wherein each of the plurality of third service requesters, has initiated a first predetermined number of historical requests for a historical departure location being within a region including the departure location, and/or for a historical departure time being within a predetermined time interval including the departure time, wherein the first predetermined number is greater than a first number threshold; and/or
wherein each of the plurality of third service requesters allows to be transmitted the carpooling message and/or have historical receipt of a second predetermined number of the carpooling messages in a first predetermined time period, wherein the second predetermined number is less than a second number threshold.

* * * * *